(12) United States Patent
Enomura

(10) Patent No.: US 12,000,661 B2
(45) Date of Patent: Jun. 4, 2024

(54) FLOW REACTOR

(71) Applicant: M. TECHNIQUE CO., LTD., Izumi (JP)

(72) Inventor: Masakazu Enomura, Izumi (JP)

(73) Assignee: M. TECHNIQUE CO., LTD., Izumi (JP)

( * ) Notice: Subject to any disclaimer, the term of this patent is extended or adjusted under 35 U.S.C. 154(b) by 0 days.

(21) Appl. No.: 17/789,096

(22) PCT Filed: Dec. 26, 2019

(86) PCT No.: PCT/JP2019/051335
§ 371 (c)(1),
(2) Date: Jun. 24, 2022

(87) PCT Pub. No.: WO2021/131006
PCT Pub. Date: Jul. 1, 2021

(65) Prior Publication Data
US 2023/0022084 A1    Jan. 26, 2023

(51) Int. Cl.
*F28D 7/00* (2006.01)
*F28D 7/16* (2006.01)
(Continued)

(52) U.S. Cl.
CPC .......... *F28D 7/0066* (2013.01); *F28D 7/1692* (2013.01); *F28F 19/04* (2013.01); *F28D 2021/0022* (2013.01)

(58) Field of Classification Search
CPC ...... F28D 7/103; F28D 7/0066; F28D 7/1692; F28D 7/022; F28D 7/04; F28D 2021/0022; F28F 19/02; F28F 19/04
See application file for complete search history.

(56) References Cited

U.S. PATENT DOCUMENTS 2,456,775 A    12/1948  Fausek et al.
2,993,682 A  *  7/1961  Huet ............... F28D 7/026
                                            165/110
(Continued)

FOREIGN PATENT DOCUMENTS

DE    2637093 A1    2/1978
FR    1169790 A     1/1959
(Continued)

OTHER PUBLICATIONS

International Search Report, issued in PCT/JP2019/051335, PCT/ISA/210, dated Feb. 4, 2020.

*Primary Examiner* — Jenna M Hopkins
(74) *Attorney, Agent, or Firm* — Birch, Stewart, Kolasch & Birch, LLP

(57) ABSTRACT

The flow reactor includes three flow passages including a first flow passage, a second flow passage, and a third flow passage which spirally circulate within a space formed between an inner tube and an outer tube. The flow passages are compartmented by an inner heat transfer body and an outer heat transfer body. The heat transfer bodies spirally circulate, have a screw-like cross-sectional shape in an axial cross-sectional view, and are assembled in a screw-like configuration. By changing the shapes of a male-thread portion and a female-thread portion, the flow passage area of the first flow passage is changed, the second flow passage and the third flow passage are spirally formed, and heat exchange and reaction take place through the heat transfer bodies.

20 Claims, 3 Drawing Sheets

(51) Int. Cl.
*F28D 21/00* (2006.01)
*F28F 19/04* (2006.01)

(56) References Cited

U.S. PATENT DOCUMENTS

| | | | |
|---|---|---|---|
| 9,791,074 B2 * | 10/2017 | Höglund | F16L 9/19 |
| 2010/0307726 A1 | 12/2010 | Chiu et al. | |
| 2014/0311612 A1 | 10/2014 | Höglund | |
| 2015/0159958 A1 * | 6/2015 | Kimura | F28F 3/02 |
| | | | 165/104.11 |
| 2017/0274339 A1 * | 9/2017 | Moon | B01J 8/22 |

FOREIGN PATENT DOCUMENTS

| | | |
|---|---|---|
| FR | 2361621 A1 | 3/1978 |
| GB | 847005 A | 9/1960 |
| JP | 53-22647 A | 3/1978 |
| JP | 2000-346569 A | 12/2000 |
| JP | 2008-134003 A | 6/2008 |
| JP | 2008-292107 A | 12/2008 |
| JP | 2012-529626 A | 11/2012 |
| JP | 2013-24536 A | 2/2013 |
| JP | 2015-502842 A | 1/2015 |
| JP | 2015-81716 A | 4/2015 |

\* cited by examiner

FLOW REACTOR

TECHNICAL FIELD

The present invention relates to a flow reactor in which a heat exchange takes place while flowing a highly reactive fluid to be processed. The flow reactor indicates a continuous flow reactor.

BACKGROUND ART

In the manufacturing processes for chemicals and foods as well as in the manufacturing processes of a toner, an inkjet, and the like, there are many demands such as those for rapid cooling and heating. Further, there are demands to reduce a space necessary for installation of the equipment as much as possible and to reduce the equipment in size; therefore, it is required to improve the performance of a flow reactor. In addition, in the flow reactor, having less adhesion, good washability, high pressure resistance, and corrosion resistance as well as low cost are required.

In the past, as disclosed in Patent Document 1, a shell-and-tube type reactor having a plurality of stages has been known. This reactor comprises at least two types of regions, which contribute to removal of a heat from a system or supply of a heat to a system in accordance with the request from the system. The reactor is provided with a group of reaction regions which are provided with a catalyst to facilitate a reaction and at the same time, they include a tube to remove or supply a heat.

However, in some of those that are described in Patent Document 1, when an adhesion or the like occurs inside the tube, not only cleaning thereof is difficult, but also the cleaning state such as whether or not cleaning was done cannot be readily confirmed.

In addition, since the amount of the heat medium held in the shell side is so large that overshoot and undershoot can readily occur, and it is basically a classical heat exchanger, thus, it is difficult to dramatically increase an overall heat transfer coefficient thereof. Further, since the tube is attached to a tube sheet, it is difficult to use this for the reaction that repeats expansion and contraction by heat. In addition, it is substantially impossible to apply coating or lining to inside of the narrow heat transfer tube, and due to its structure, also in the other flow paths, it is difficult to apply coating or lining with a corrosion resistant material; therefore, in view of the corrosion resistance and the like, improvements thereof are required. Especially, it is substantially impossible to apply coating or lining to inside the heat transfer tube with a corrosion resistant material, and even if this could be done, mass production thereof is poor so that this is inevitably non-practical from a viewpoint of the cost thereof.

Patent Document 2 describes the heat exchanger in which a liquid-side heat transfer tube having a cross sectional shape of a substantially triangle is formed into coiled-shape, and in the outer periphery thereof, a cooling medium-side heat transfer tube is arranged in a coiled-shape, and then, the liquid-side heat transfer tube and the cooling medium-side heat transfer tube are joined. However, even if the technology is applied to the flow reactor, the heat transfer area is too small and is specialized for a water heater and the like; therefore, reduction in the size, washability, improvement in the performance, and reduction in the cost could not be realized yet.

Patent Document 3 describes the heat exchanger having a first flow path-forming member that has a container shape and a second flow path-forming member that is detachably disposed to the first flow path-forming member in the inner side of the first flow path member, wherein the first flow path-forming member has the diameter of the inner peripheral surface of the peripheral inner wall portion of container shape which gradually narrows from upper part to lower part, and a first flow path through which a liquid for heat exchange is flowed is formed in the peripheral wall portion, and between the inner peripheral surface of the first flow path-forming member and the outer peripheral surface of the second flow path-forming member, a spiral second flow path through which the liquid for heat exchange and a liquid to be heat-exchanged by the inner peripheral surface and the outer peripheral surface are flowed is formed.

However, because the flow rate on the heat-transfer surface changes gradually due to gradual narrowing of the flow path, it is difficult to apply this equipment to in general industry; in addition, in the case of heat exchange accompanied with boiling, there are many retention portions of a generated gas thereby readily causing the dry-out trouble, thus this cannot apply to the flow reactor.

Patent Document 4 describes a tubular flow module provided with at least two concentric tubes having spiral shapes. It is shown that this tubular flow module can be applied to a flow reactor that is provided with a heat exchanging function. This module is characterized in that an inner tube and an outer tube are assembled into thread shape, in which a flow path for a fluid is set between the tubes. However, an average flow direction thereof is an axial direction; thus, the purpose thereof is to create an improved plug flow state from a flow formed in all directions. Therefore, regarding a main flow of the fluid, this is not the idea to create a flow close to a complete spiral flow and increase an overall heat transfer coefficient, which indicates the efficiency of the heat transfer. Specifically, in Patent Document 4, this module was configured such that even when the tube was made to have a spiral shape, the width of the flow path formed between the tube and the tube was made uniform, whereby the improved plug flow state was created by adding a spiral flow in the axial direction; thus, this was not to create the spiral flow so as to enhance the efficiency of the heat transfer.

PRIOR ART DOCUMENTS

Patent Documents

Patent Document 1: Japanese Patent Application Publication of International Patent Application No. 2012-529626
Patent Document 2: Japanese Patent Laid-Open Publication No. 2013-24536
Patent Document 3: Japanese Patent Laid-Open Publication No. 2015-81716
Patent Document 4: Japanese Patent Application Publication of International Patent Application No. 2015-502842

DISCLOSURE OF INVENTION

Problems to be Solved by the Invention

Under the circumstances described above, an object of the present invention is to provide a flow reactor having a structure advantageous for increasing an overall heat transfer coefficient, which represents the efficiency of the heat exchange relative to a reactive fluid to be processed.

Another object of the present invention is to provide a flow reactor having a structure suitable for suppressing the retention of a substance to be processed or of a generated gas in a heat transfer portion.

Still another object of the present invention is to provide a flow reactor having good washability.

Still another object of the present invention is to provide a flow reactor that can be decomposable.

Still another object of the present invention is to provide a flow reactor capable of applying coating or lining.

Means for Solving the Problems

The present invention relates to improvement of a flow reactor provided with three flow paths of a first flow path, a second flow path, and a third flow path, all of which spirally circulates in a space formed between an inner tube and an outer tube that are concentrically arranged, in which a heat exchange takes place between a fluid to be processed as a first fluid flowing through the first flow path, and a second fluid flowing through a second flow path and a third fluid flowing through a third fluid path via a heat transfer body.

In the present invention, the heat transfer body is arranged in a gap formed between the inner tube and the outer tube while spirally circulating; in an axial-direction cross sectional view, a cross sectional shape thereof is a thread shape, which is assembled into thread shape; and by changing shapes of an external thread portion and an internal thread portion, a flow path area of the first flow path is changed, and the second flow path and the third flow path are formed in a spiral shape; whereby the heat exchange takes place via the heat transfer body.

The present invention may be carried out such that the heat transfer body is arranged in the gap formed between the inner tube and the outer tube while spirally circulating; in an axial-direction cross sectional view, a cross sectional shape thereof is a thread shape, which is assembled into thread shape; and by changing angles of screw threads of the external thread portion and the internal thread portion, the shapes of the external thread portion and the internal thread portion are changed.

Further in the present invention, a flow reactor configured such that the heat transfer body is assembled into thread shape with a cylindrical inner heat transfer body as an external thread portion and a cylindrical outer heat transfer body as an internal thread portion, a space between the inner heat transfer body and the outer heat transfer body is made as a first flow path through which a first fluid flows, a second flow path provided in an inner side of the inner heat transfer body and a third flow path provided in an outer side of the outer heat transfer body are arranged, a heat exchange takes place between a second fluid flowing through the second flow path and the first fluid via the inner heat transfer body, and a heat exchange takes place between a third fluid flowing through the third flow path and the first fluid via the outer heat transfer body, wherein, the following features are characterized. In the present invention, the first flow path is a flow path that spirally circulates, and a ratio ($\alpha/\beta$) of a maximum flow path width ($\alpha$) of the first flow path to a minimum flow path width ($\beta$) of the first flow path in a radius direction is 2 or more ($2<\alpha/\beta<\infty$).

The present invention may be carried out such that the flow reactor is provided with an inner tube and an outer tube, which are concentrically arranged; the inner heat transfer body is fixed to an outside of the inner tube, the outer heat transfer body is fixed to an inside of the outer tube; a space between the inner tube and the inner heat transfer body is served as the second flow path, and a space between the outer tube and the outer heat transfer body is served as the third flow path.

Here, both the second flow path and the third flow path may be served as flow paths that spirally circulate.

Also, the present invention may be carried out such that a space generated by at least any one of differences of an angle difference between an angle ($\theta 1$) of the screw thread of the inner heat transfer body as the external thread portion and an angle ($\theta 2$) formed by both flanks of the outer heat transfer body as the internal thread portion and a height difference between height of the screw thread of the inner heat transfer body as the external thread portion and a height of the screw thread of the outer heat transfer body as the internal thread portion is served as the first flow path.

It is preferable that the first flow path, the second flow path, and the third flow path do not have a horizontal portion where the first fluid, the second fluid, and the third fluid may accumulate.

In addition, the flow reactor may have a plurality of the spaces concentrically formed between the inner tube and the outer tube that are concentrically arranged.

Here, it is preferable that flow paths including the first flow path flowing the first fluid be coated with a corrosion resistant material. As for the corrosion resistant material coating, a fluorine resin coating may be shown.

Advantages

The present invention could provide the flow reactor having the structure advantageous for increasing an overall heat transfer coefficient, which represents the efficiency of the heat exchange.

The present invention could provide the flow reactor having a structure suitable for suppressing the retention of a substance to be processed or of a generated gas in a heat transfer portion.

The present invention could provide the flow reactor having good washability.

The present invention could provide the flow reactor having the structure that can be readily decomposed.

The present invention could provide the flow reactor capable of applying coating or lining.

More specifically, in the manufacturing processes for chemicals and foods as well as in the manufacturing processes of a toner, an inkjet, and the like, there are many demands such as those for rapid cooling and heating, and in its object, namely the fluid to be processed contains a large amount of a highly viscous liquid, a slurry liquid including microparticles, and adhering substances.

Basically, the performance of the flow reactor is expressed by a heat transfer area per unit volume, an overall heat transfer coefficient, and a controllability of the Reynolds number of the flow. Then, when the heat transfer area per unit volume and the overall heat transfer coefficient are larger, the performance and the heat exchange function are higher, thus it is essential that the reaction can be carried out under the desired temperature conditions and by controlling the flow field.

According to the present invention, the heat transfer area per unit volume is significantly larger than those described in the prior references. In addition, the heat transfer resistance and the fouling coefficient on the heat exchange-heat transfer surface are not described here because these are derived from a material and an environment; but in order to increase the overall heat transfer coefficient, the degree of a turbulent flow on the heat exchange-heat transfer surface is the biggest factor. The various methods such as increasing the flow rates of the fluid to be processed and of the heat medium, and installing a baffle plate are taken, but pressure loss in each case become a problem. Therefore, in the present invention, in order to generate the state of a turbulent flow while minimizing the pressure loss, a spiral flow is utilized together with the fluid to be processed and the heat medium. The spiral flow could readily generate the state of a turbulent flow due to a centrifugal force effect thereof thereby increasing the Reynolds number; and further in the case of being used in a counter flow, the flow reactor capable of performing heat exchange with even higher performance could be realized.

In addition, in the case that a heating operation accompanied with evaporation is conducted, when a generated gas retains, the heat conductivity thereof drops to almost the same low level as the single-phase flow of the generated gas. This phenomenon is called a dry-out phenomenon in which a liquid film flowing along the heat transfer surface disappears by evaporation thereby causing a gas phase thereof by directly contacting with the heat transfer surface, therefore the intended reaction cannot be obtained. In addition, certain improvements are required; thus, not only a high performance, but also it must be processed as calculated even when the size thereof is large.

In order to solve these problems, the relationship between the flow rate of the substance to be processed and the pressure loss was reconsidered; and as a result, the present invention could provide the flow reactor having the structure that even if the flow rate is increased, the pressure loss does not become too large. This effect is large especially when the substance to be processed is a highly viscous or the slurry that readily precipitates, which results in decrease of dirt and adhesion.

In addition, by making the heat transfer body substantially triangle, the retention of liquid and the generated gas does not exist, and the heat transfer area can be made large. Accordingly, there is a flexibility of design that the substantially triangle is selected as the cross-sectional shape of the heat transfer body from the physical properties of the substance to be processed.

In addition, because the held amount of the substance to be processed is small, rapid heating or rapid cooling can be handled, and at the same time the held amount of the heating medium or cooling medium is also small, reduction in the size of the equipment, improvement in the performance, and easy control could be realized.

Since the structure of the flow reactor is very simple and easy to disassemble and assemble, this can be coated or lined with a corrosion resistant material.

BEST MODES FOR CARRYING OUT THE INVENTION

Figure 1:
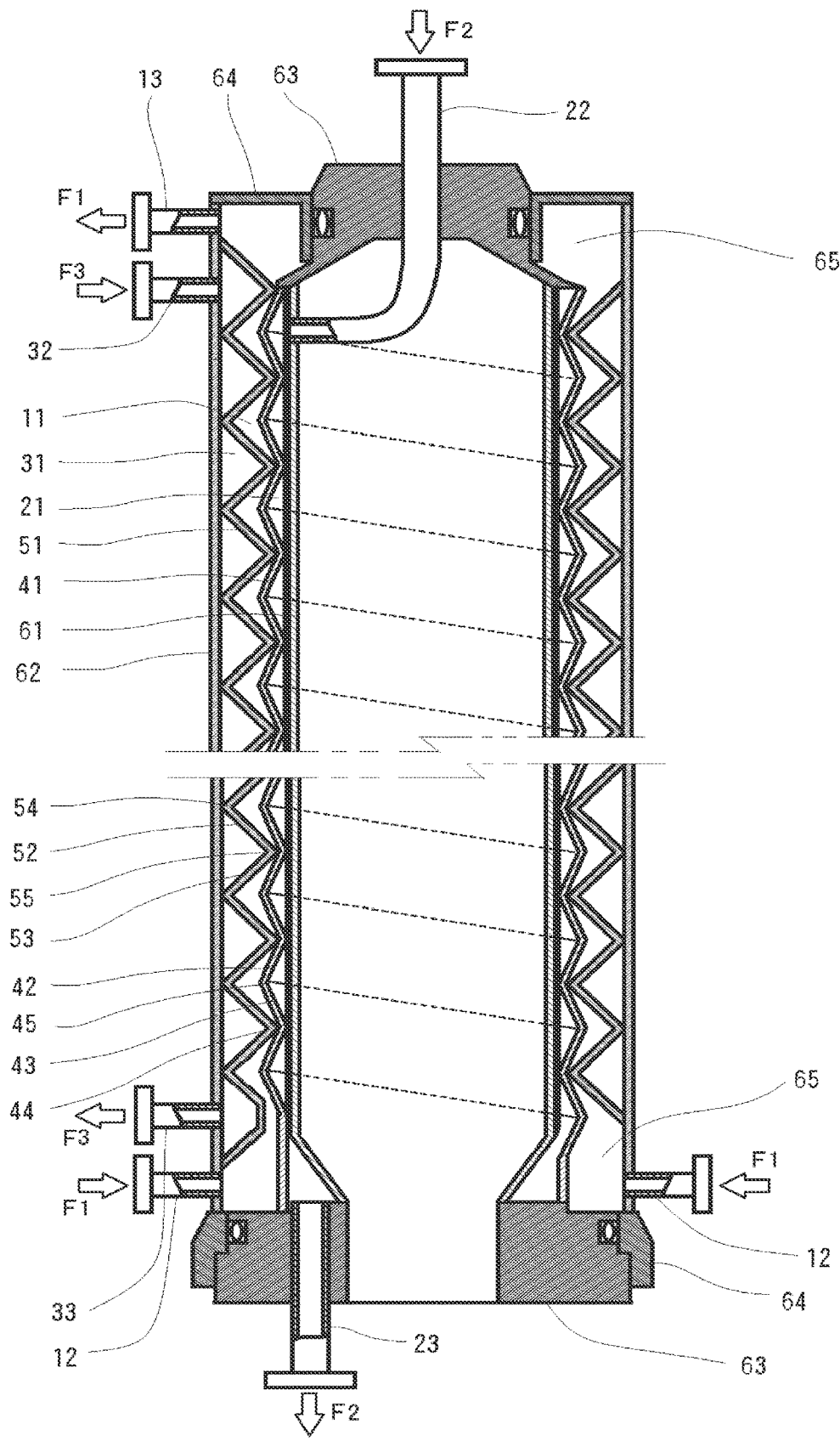
FIG. 1 is an axial-direction cross sectional view of a flow reactor according to a first embodiment of the present invention.

Hereinafter, with reference to the drawings, a flow reactor according to each of the embodiments of the present invention will be described.

(With Regard to the Fluids)

In the embodiments, a fluid that is a reactive fluid to be processed and is intended for heat exchange is described as a first fluid F1. Since the heat exchange and the reaction is conducted in order to exchange a heat energy between two fluids, it is not necessary to distinguish them as a major fluid and a minor fluid; but, in general, the heat exchange is mostly conducted for the purpose of heating or cooling a specific fluid. Therefore, in the embodiments, the flow path of the first fluid F1 for the purpose of heating or cooling will be described as the first fluid F1. And the fluid that exchanged the heat with the first fluid F1 will be described as a second fluid F2. Further, other fluid that exchanges the heat with the first fluid F1 is described as a third fluid F3.

Illustrative examples of the first fluid F1 may include various fluids such as a gas, a liquid, and a slurry, as the fluid to be processed. Illustrative examples of the second fluid F2 and the third fluid F3 may include heat media such as a steam, a hot water, a cold water, and a nitrogen gas. However, these fluids should not be considered as a specific type of fluid; thus, it does not prevent from that the first fluid F1 may be the heat medium, and the second fluid F2 and the third fluid F3 may be the fluids for heat exchange.

An inner axis portion 63 arranged in the upper and lower ends of an inner tube 61 is inserted into a fixed cylinder portion 64 arranged in the upper and lower ends of an outer tube 62 to fix the inner axis portion 63 and the fixed cylinder portion 64 thereby being connected, in this connected state, the positional relation between an inner heat transfer body 41 and an outer heat transfer body 51 is also fixed.

Outline of the First Embodiment

Figure 2:
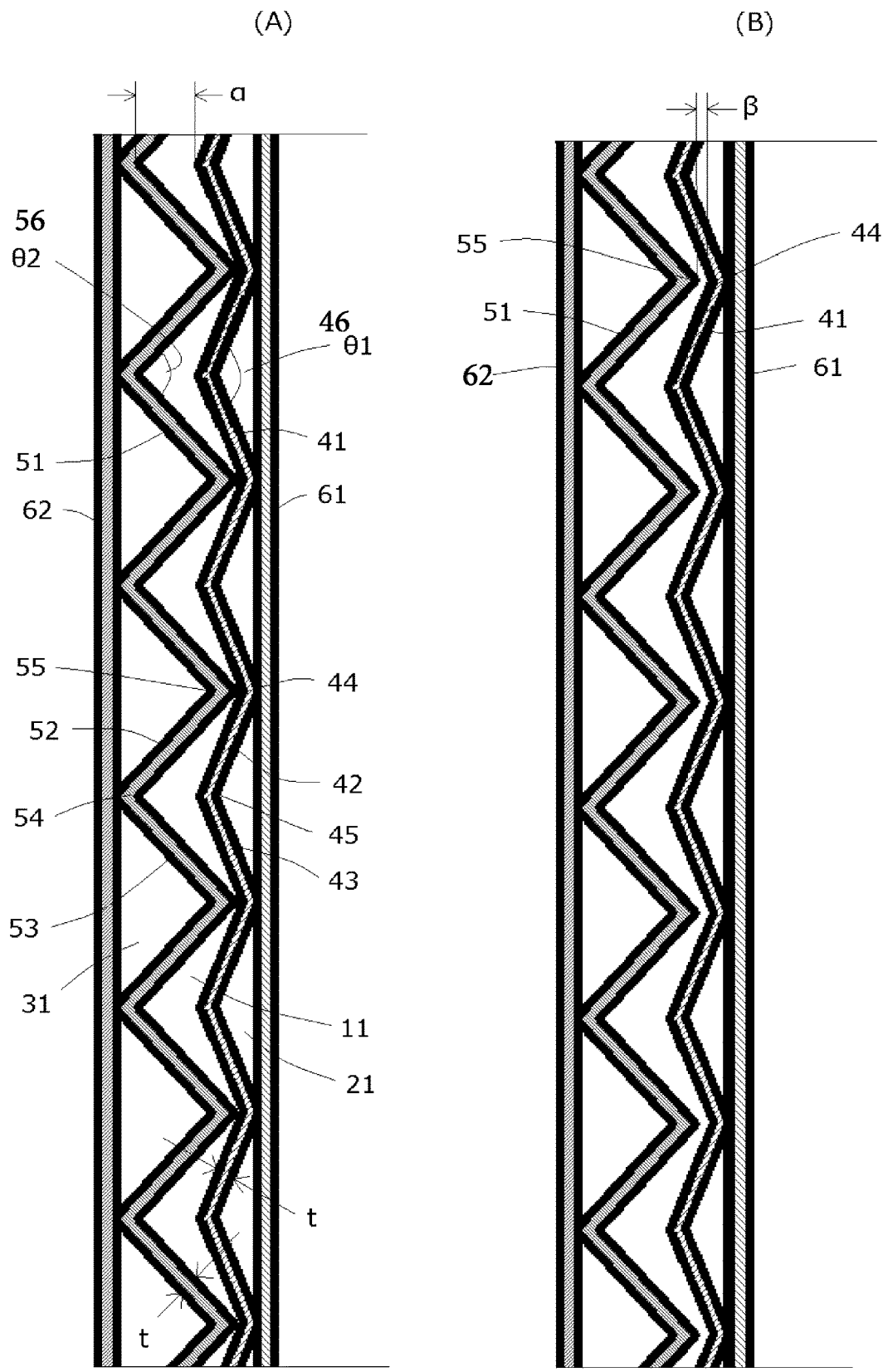
FIG. 2 is an enlarged cross-sectional view of the essential part of FIG. 1.

The flow reactor according to the first embodiment as shown in FIG. 1 and FIG. 2 is provided with the inner tube 61 and the outer tube 62 that are concentrically arranged; the flow reactor may also be further provided with another cylinder inside or outside thereof.

A space between the inner tube 61 and the outer tube 62 is partitioned into three spaces by the inner heat transfer body 41 and the outer heat transfer body 51. The inner heat transfer body 41 and the outer heat transfer body 51 are substantially concentric cylindrical shapes as a whole, and the inner tube 61 and the outer tube 62 are also concentric.

The space between the inner heat transfer body 41 and the outer heat transfer body 51 constitutes a first flow path 11, the space between the inner tube 61 and the inner heat transfer body 41 constitutes a second flow path 21, and the space between the outer tube 62 and the outer heat transfer body 51 constitutes a third flow path 31. All of these flow paths spirally circulate and extend in the axial direction of the inner tube 61 and the outer tube 62.

By maintaining the state of an airtightness and a liquid tightness by welding or the like, fixing of the inner heat transfer body 41 to the inner tube 61 and fixing of the outer heat transfer body 51 to the outer tube 62 are separated so that each fluid in the respective flow path do not mix.

The heat exchange is performed between the first fluid F1 and the second fluid F2 via the inner heat transfer body 41, and the heat exchange is performed between the first fluid F1 and the third fluid F3 via the outer heat transfer body 51.

The inner heat transfer body 41 is fixed to the outside of the inner tube 61 and is rotatable as a single body. The outer heat transfer body 51 is fixed to the inside of the outer tube 62 and is rotatable as a single body.

The inner heat transfer body 41 is served as an external thread portion and the outer heat transfer body 51 is served as an internal thread portion so that they are assembled into a thread shape. They are separably assembled by rotating the inner heat transfer body 41 and the inner tube 61 relative to the outer heat transfer body 51 and the outer tube 62.

Under the separated state, a flow path constitution surface that defines the first flow path 11 is separated into the side of the inner heat transfer body 41 and the side of the outer heat transfer body 51.

(With Regard to the Inner Heat Transfer Body 41 and the Outer Heat Transfer Body 51)

The inner heat transfer body 41 is extended in the axial direction while spirally circulating on the outer circumferential surface of the inner tube 61, in which the cross-sectional shape thereof in the axial-direction cross sectional view is a substantially triangle.

The outer heat transfer body 51 is extended in the axial direction while spirally circulating on the inner circumferential surface of the outer tube 62, in which the cross-sectional shape thereof in the axial-direction cross sectional view is a substantially triangle.

The pitch and the lead angle of them are the same so that the inner heat transfer body 41 is assembled as the external thread portion and the outer heat transfer body 51 is assembled as the internal thread portion. Therefore, the inner heat transfer body 41 will be explained as the external thread, and the outer heat transfer body 51 will be explained as the internal thread.

The inner heat transfer body 41 is provided with a valley portion 44 where the outer diameter thereof is the least, a peak portion 45 where the outer diameter thereof is the largest, and a first slope portion 42 and a second slope portion 43 connecting the valley portion 44 and the peak portion 45, then, the inner heat transfer body 41 is fixed to the inner tube 61 at the valley portion 44. In addition, the outer heat transfer body 51 is provided with a peak portion 55 where the inner diameter thereof is the least, a valley portion 54 where the inner diameter thereof is the largest, and a first slope portion 52 and a second slope portion 53 connecting the peak portion 55 and the valley portion 54; then, the outer heat transfer body 51 is fixed to the outer tube 62 at the valley portion 54.

In this example, as shown in FIG. 2A, the diameters of the valley portion 44 and of the peak portion 55 are substantially the same, and they may be in contact with each other. Further, as shown in FIG. 2B, the outer diameter of the valley portion 44 of the inner heat transfer body 41 may be slightly smaller than the inner diameter of the peak portion 55 of the outer heat transfer body 51, and a gap may be opened between them. This gap is the minimum flow path width ($\beta$) of the first flow path 11. When they are in contact with each other as shown in FIG. 2A, $\beta$ is equal to zero; and even when there is a gap as shown in FIG. 2B, $\beta \leq 4$ mm is preferable.

The angle ($\theta 1$) of screw thread formed by the first slope portion 42 and the second slope portion 43 of the inner heat transfer body 41 is greater than the angle ($\theta 2$) formed by both flanks of the first slope portion 52 and the second slope portion 53 of the outer heat transfer body 51. By so doing, as shown in FIG. 2A, a space is formed between the first slope portion 42 and the second slope portion 43 of the inner heat transfer body 41 and the first slope portion 52 and the second slope portion 53 of the outer heat transfer body 51; so, this portion becomes the first flow path 11. This space is the largest between the peak portion 45 of the inner heat transfer body 41 and the valley portion 54 of the outer heat transfer body 51, and the space defines a maximum flow path width ($\alpha$) of the first flow path 11 in the radius direction.

The ratio (an) of the maximum flow path width ($\alpha$) to the minimum flow path width ($\beta$) in the first flow path 11 is preferably 2 or more, while more preferably 10 or more. When the valley portion 44 and the peak portion 55 are in contact with each other, $\beta=0$, and $\alpha/\beta=\infty$.

In the mathematical sense, the triangle has two hypotenuses intersect with each other at the apex; but when presupposing the industrial production thereof such as processing of a metal plate, in general, the apex thereof is rounded, or has an axial-direction length of the cross-sectional shape thereof. Therefore, it must be understood that the term "substantially triangle" includes not only the mathematical triangle but also the shapes with presupposition of industrial production thereof. In the where the peak portion and the valley portion have the cross-sectional shape having the axial-direction length, as the axial-direction length increases, the risk that the fluid is clogged increases; therefore, the axial-direction length is appropriately shorter than the axial-direction length of one slope portion.

Because the heat exchange of the fluids is performed across the inner heat transfer body 41 and the outer heat transfer body 51 (see, FIG. 2A), in view of the efficiency of the heat exchange, the thickness t of the inner heat transfer body 41 and the outer heat transfer body 51 is preferably in the range of 0.2 mm to 3 mm, while more preferably in the range of 0.5 mm to 2 mm. The thicknesses of the inner tube 61 and the outer tube 62 may be the same as the above-mentioned thickness. Here, however, the thicknesses thereof are not limited to this range; it may be modified in view of the working strength as the structural body.

The inner heat transfer body 41 and the outer heat transfer body 51 may also be said which is composed of a sterically shaped portion having at least one bending portion (this includes not only the portion in which a straight line is bent with an angle but also the portion that is curved like an arc). The sterically shaped portion has at least one bending portion and has the shape capable of forming the spaces (the reaction flow path 11 and the second flow path 21) in which fluids can be flowed in both the inner surface side and the outer surface side thereof. Specifically, the sterically shaped portion is a long body having the shape like a polygonal square tube or a tube divided along the axial direction thereof; in this example, the sterically shaped portion is a long body having the shape like the one that a square tube is divided on the diagonal line of its square cross section along the axial direction. The sterically shaped portion is wounded around the outer circumferential surface of the inner tube 61 and the inner circumferential surface of the outer tube 62, respectively, and the upper and lower end sides of them are fixed to the outer circumferential surface of the inner tube 61 and the inner circumferential surface of the outer tube 62, respectively.

(With Regard to the First Flow Path 11)

The first flow path 11 according to this embodiment is a polygonal space defined by the first slope portion 42 and the second slope portion 43 of the inner heat transfer body 41, the first slope portion 52 and the second slope portion 53; and this flow path is the flow path of the first fluid F1, which is the main object of heat exchange and reaction.

In the flow reactor according to this embodiment, as shown in FIG. 2A and as described above, the space between the peak portion 45 of the inner heat transfer body 41 and the valley portion 54 of the outer heat transfer body 51 defines the maximum flow path width ($\alpha$) of the first flow path 11 in the radius direction. When the valley portion 44 and the peak portion 55 are in contact with each other, the minimum flow path width ($\beta$) is equal to zero, and $\alpha/\beta=\infty$; so that the first fluid F1 becomes a perfect spiral flow and advances in the axial direction while repeatedly circulating. As a result, not only the length of the flow path in which a heat exchange or a chemical reaction is carried out can be increased, but also high heat exchange can be provided by utilizing the spiral flow. In other words, the spiral flow can readily generate the state of a turbulent flow due to an affection of centrifugal force thereof, whereby the Reynolds number is increased to realize a high performance of heat exchange. As a result, the overall heat transfer coefficient, which represents the efficiency of the heat exchange and reaction, can be increased.

Further, even in the case where a gap is existed between the valley portion 44 and the peak portion 55 as shown in FIG. 2B, by setting the ratio ($\alpha/\beta$) of the maximum flow path width ($\alpha$) to the minimum flow path width ($\beta$) of the first flow path 11 to 2 or more, while more preferably 10 or more, the fluid flowing in the axial direction in a short pass can be reduced as much as possible, so that the flow becomes the spiral flow as a whole.

Specifically, the minimum flow path width ($\beta$) is preferably in the range of 0 mm to 4 mm; and the maximum flow path width ($\alpha$) is preferably in the range of 4 mm to 75 mm, while more preferably in the range of 10 mm to 50 mm. The shape and the size of the space of the first flow path 11 are defined by the angle difference between the angle ($\theta 1$) of the screw thread of the inner heat transfer body 41 and the angle ($\theta 2$) formed by both flanks of the outer heat transfer body 51; thus, these angles may be changed in accordance with the kind of the fluid and the purpose of the processing.

Figure 3:
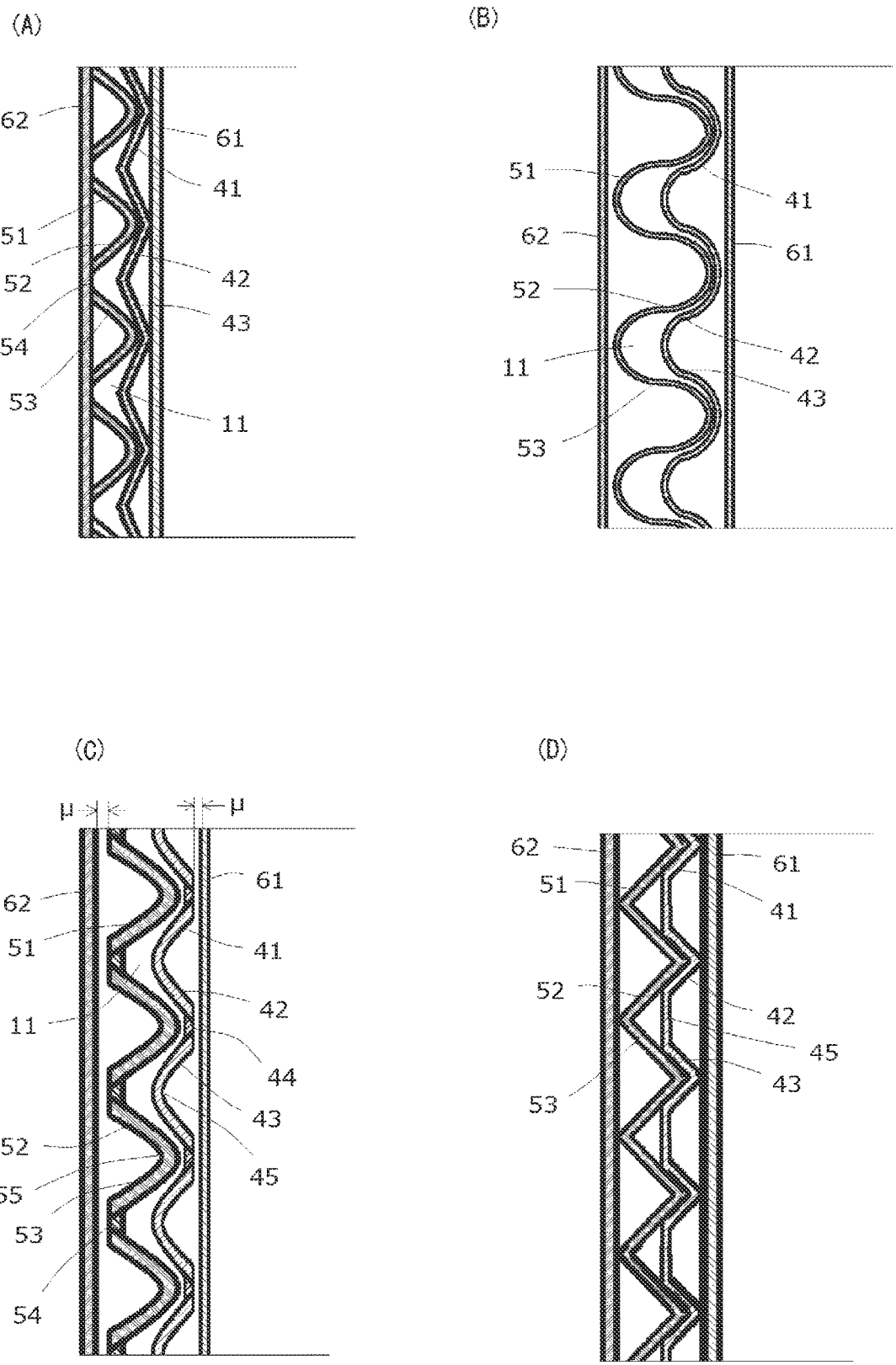
FIG. 3A to FIG. 3D are an axial-direction cross sectional view of the essential part showing the modification examples of the flow reactor according to the respective embodiments of the present invention.

Further, as shown in FIG. 3A, the outer heat transfer body 51 may be circulated with a distance in the axial direction, or the inner heat transfer body 41 may be circulated with a distance in the axial direction, although not shown. In this case, the outer tube 62 located between the circulating outer heat transfer bodies 51 serves as the valley portion 54; the first flow path 11 is a space surrounded by the first slope portion 42, the second slope portion 43, the first slope portion 52, the second slope portion 53, and the valley portion 54.

When the axial-direction length of the valley portion 54 is increased, the cross-sectional area (flow path area) of the first flow path 11 can be increased, but the cross-sectional area (flow path area) of the third flow path 31 decreases, therefore, this length can be determined in consideration of the balance thereof in view of the overall of the heat transfer rate and the reaction rate.

It is appropriate that the first slope portion 42 and the second slope portion 43 of the inner heat transfer body 41, as well as the first slope portion 52 and the second slope portion 53 of the outer heat transfer body 51 are linear in the axial-direction cross-sectional view, but they may be curved lines such as an arch shape or the like, or the entire of them may be constituted with curved lines as shown in FIG. 3B.

However, it is preferable that each cross-sectional shape as mentioned above have the shape in which the substance to be processed, i.e., the first fluid F1 or a gas is unlikely to accumulate. For example, it is preferable to avoid providing a flat horizontal portion or a depression portion in a part of the flow path unless there is a special purpose.

In addition, as shown in FIG. 3C, the valley portion 44 of the inner heat transfer body 41 may have the length in the axial-direction, so that the inner heat transfer body 41 may be served as one cylindrical body as a whole. In this case, the inner heat transfer body 41 is composed of the sterically shaped portion defined by the first slope portion 42, the second slope portion 43, and the peak portion 45, and the flat plate-like valley portion 44, so that the cylindrical body is constituted by the whole of them. Similarly, the outer heat transfer body 51 may be the cylindrical body that is composed of the sterically shaped portion defined by the first slope portion 52, the second slope portion 53, and the peak portion 55, and the flat plate-like valley portion 54.

In these cases, the inner heat transfer body 41 and the outer heat transfer body 51 may not have a gap between the valley portion 44 and the inner tube 61 or may not have a gap between the valley portion 54 and the outer tube 62; or, they may have a gap ($\mu$). When the gap ($\mu$) is provided, it is preferably set to 4 mm or less. When this gap ($\mu$) is made too large, since the amounts of the second fluid F2 and the third fluid F3 that flow in a short pass in an axial direction is increased without spirally flowing, there is a risk that the efficiencies of the heat exchange and reaction decrease.

It is expected that various fluids such as a gas, a liquid, a slurry, and a fluid flow in the first flow path 11 as the first fluid F1. At this time, depending on the type of the fluid, a highly viscous substance or a slurry easily precipitate may adhere to the first flow path 11. In this embodiment, however, since the first flow path 11 has the substantially triangle shape in the axial-direction cross-sectional view and has no narrow portion that has a dead end, the first flow path 11 has the structure such that the generation of adhesion can be suppressed.

Also, upon disassembling for cleaning, when the inner tube 61 and the inner heat transfer body 41 are separated from the outer tube 62 and the outer heat transfer body 51 by relatively rotating them in a manner of removing the screws, in the first flow path 11, the surface of the first flow path 11 on the inner circumferential side (the inner heat transfer body 41 and the outer circumferential surface of the inner tube 61) and the surface of the first flow path 11 on the outer circumferential side (the outer heat transfer body 51 and the inner circumferential surface of the outer tube 62) are completely separated and exposed; and in addition, all the angles appearing on these surfaces are 90 degree or more. Accordingly, not only the first flow path 11 can be cleaned in every corner, but also it is easy to confirm the state at the time of completion of the cleaning.

On the other hand, when a coil having a circular cross sectional shape is arranged between the inner circumferential surface of the outer tube and the outer circumferential surface of the inner tube, the gap thereof is inevitably narrow; and in addition, even when the inner tube and the outer tube are separated, unless the coiled heat transfer tube is separated, a half of the backside of the coiled heat transfer tube, when viewed from the radius direction, is not directly exposed because of being hidden by a half of the frontside thereof. Accordingly, not only the cleaning in every corner is difficult but also it is not easy to confirm the cleaning state.

The material of each surface that defines the flow path of the fluid such as the first flow path 11 may be selected in accordance with the types of the first fluid F1 such as metal. In addition, it is preferable that the surface thereof be coated with a corrosion resistant material. Illustrative examples of the coating with a corrosion resistant material may include a glass lining, a fluorine resin coating, and a ceramic coating. At this time, after the inner tube 61 and the inner heat transfer body 41 are fixed, or after the outer tube 62 and the outer heat transfer body 51 are fixed, they are processed with a corrosion resistant material, then are screwed together for assemble, the entire inner surface of the first flow path 11 can be reliably coated.

(With Regard to the Second Flow Path 21)

The space between the inner heat transfer body 41 and the inner tube 61 constitutes the second flow path 21 having substantially triangular shape in the axial-direction cross-sectional view. Similarly to the first flow path 11, the second flow path 21 spirally circulates, but, contrary to the first flow path 11, the second flow path 21 is a closed space in the axial-direction cross-sectional view, by the mere separation using the screw method as described above, the closed state is maintained. However, since a heat medium such as a steam, a hot water, a cold water, and a nitrogen gas is generally passed through the second flow path 21 as the second fluid F2, the adhesion of the fluid or the like barely occurs on contrary to the first flow path 11.

(With Regard to the Third Flow Path 31)

The space between the outer heat transfer body 51 and the outer tube 62 constitutes the third flow path 31 having substantially triangular shape in the axial-direction cross section view. Similarly to the first flow path 11, the third flow path 31 spirally circulates, but contrary to the first flow path 11, the third flow path 31 is a closed space in the axial-direction cross-sectional view, by the mere separation using the screw method as described above, the closed state is maintained. However, since a heat medium such as a steam, a hot water, a cold water, and a nitrogen gas is generally passed through the third flow path 31 as the third fluid F3, the adhesion of the fluid or the like barely occurs on contrary to the first flow path 11.

Note that the circulation directions of the first flow path 11, the second flow path 21, and the third flow path 31 may be different (for example, clockwise or counterclockwise direction), or may be the same.

(With Regard to the Inflow Portion and the Outflow Portion)

The first fluid F1 enters from an inflow portion 12 arranged in the fixed cylinder portion 64 at the lower end as shown in FIG. 1 into the spiral first flow path 11 via a circular flow path 65, and advances in the upward direction while spirally circulating, and then flows out to the outside from an outflow portion 13 via the circular flow path 65 arranged in the fixed cylinder portion 64 at the upper end. Further, the length thereof may be determined by the retention time of the first fluid F1 in accordance with the purpose of the reaction. By arranging a plurality of the inflow portions 12, a plurality of the fluids may be mixed in the circular flow path 65, or a fluid previously mixed by a mixer such as a static mixer or a continuous mixer that is installed outside of the system (not shown) may be introduced.

The second fluid F2 enters from an inflow portion 22 which is arranged to penetrate the inner axis portion 63 at the upper end as shown in FIG. 1 into the spiral second flow path 21, and advances in the downward direction while spirally circulating, and then flows out to the outside from an outflow portion 23 arranged in the inner axis portion 63 at the lower end.

The third fluid F3 enters from an inflow portion 32 arranged in the upper end side of the outer tube 62 as shown in FIG. 1 into the spiral third flow path 31, and advances in the downward direction while spirally circulating, and then flows out to the outside from an outflow portion 33 arranged in the lower end side of the outer tube 62.

Note that, upon carrying out this embodiment, the inflow portion and the outflow portion of each flow path may be reversed.

The material of each surface that defines the flow paths of the first fluid F1, the second fluid F2 and the third fluid F3 such as the first flow path 11, the second flow path 21 and the third flow path 31 may be selected in accordance with the types of the first fluid F1 and the second fluid F2 such as metal. In addition, it is preferable that the surface thereof be coated with a corrosion resistant material. Illustrative examples of the coating with a corrosion resistant material include a glass lining, a fluorine resin coating, and a ceramic coating.

Other Embodiments

The present invention may be carried out with various modifications in addition to the above-mentioned embodiments. For example, the first flow path 11 may be configured such that the heights of the external thread of the inner heat transfer body 41 and the internal thread of the outer heat transfer body 51 are made different. Specifically, as shown in FIG. 3D, the angle ($\theta 1$) of the screw thread defined by the first slope portion 42 and the second slope portion 43 of the inner heat transfer body 41 is set to the same as the angle ($\theta 2$) formed by both flanks that are defined by the first slope portion 52 and the second slope portion 53 of the outer heat transfer body 51, and at the same time the height of the screw thread in the side of the inner heat transfer body 41 is lowered so that the peak portion 45 has a length in an axial-direction, whereby the space defined by the peak portion 45, the first slope portion 52, and the second slope portion 53 may be served as the first flow path 11.

Further, in each of the embodiments described above, the embodiments are carried out such that the inner tube 61 and the outer tube 62 are the cylindrical bodies; but when the embodiments are carried out such that they are the tubes having concave and convex shape and are extended spirally, the cross-sectional areas of each flow paths of the second flow path 21 and the third flow path 31 can be increased.

Further, although not shown, by arranging another cylinder inside or outside of the inner tube 61 and of the outer tube 62, and by arranging the inner heat transfer body 41 and the outer heat transfer body 51 in the space between the cylinders, a plurality of the concentric spaces for the reaction can be formed.

REFERENCE NUMERALS

F1 First fluid
F2 Second fluid
F3 Third fluid
11 First flow path
12 Inflow portion
13 Outflow portion
21 Second flow path
22 Inflow portion
23 Outflow portion
31 Third flow path
32 Inflow portion
33 Outflow portion
41 Inner heat transfer body
42 First slope portion
43 Second slope portion
44 Valley portion
45 Peak portion
46 Angle $\theta 1$ of screw thread
51 Outer heat transfer body
52 First slope portion
53 Second slope portion
54 Valley portion
55 Peak portion
56 Angle $\theta 2$ formed by both flanks 61 Inner tube
62 Outer tube
63 Inner axis portion
64 Fixed cylinder portion
65 Circular flow path

The invention claimed is:

1. A flow reactor comprising three flow paths of a first flow path, a second flow path, and a third flow path all of which spirally circulates in a space formed between an inner tube and an outer tube that are concentrically arranged, wherein
   a heat exchange is performed between a fluid to be processed, which is a first fluid flowing through the first flow path, and a second fluid and a third fluid flowing through the second flow path and the third flow path via a heat transfer body,
   wherein the flow reactor includes:
      the inner tube and the outer tube;
      an inner heat transfer body and an outer heat transfer body disposed in the space formed between the inner tube and the outer tube,
      wherein a first distance between a peak portion of the inner heat transfer body and a valley portion of the outer heat transfer body in a radial direction defines a maximum flow path width of the first flow path, and a second distance between a valley portion of the inner heat transfer body and a peak portion of the outer heat transfer body in the radial direction defines a minimum flow path width of the first flow path, the minimum flow path width being smaller than the maximum flow path width,
      wherein a cross sectional shape of the inner and outer heat transfer bodies in an axial-direction cross sectional view is a thread shape, and the inner and outer heat transfer bodies are assembled into a thread shape; by changing shapes of an external thread portion and an internal thread portion, a flow path area of the first flow path is changed, and the second flow path and the third flow path are spirally formed; then the heat exchange is performed via the inner and outer heat transfer bodies, and
      wherein an angle formed by the peak portion of the inner heat transfer body is larger than an angle formed by the valley portion of the outer heat transfer body.

2. The flow reactor according to claim 1, wherein the inner and outer heat transfer bodies are arranged in the space formed between the inner tube and the outer tube while spirally circulating; the cross sectional shape of each of the inner and outer heat transfer bodies in the axial-direction cross sectional view is the thread shape, and the inner and outer heat transfer bodies are assembled into the thread shape; and by changing angles of screw threads of the external thread portion and the internal thread portion, the shapes of the external thread portion and the internal thread portion are changed.

3. A flow reactor configured such that a cylindrical inner heat transfer body is served as an external thread portion, a cylindrical outer heat transfer body is served as an internal thread portion, the inner and outer heat transfer bodies are assembled into a thread shape; a space between the inner heat transfer body and the outer heat transfer body is served as a first flow path through which a first fluid flows; a second flow path provided in an inner side of the inner heat transfer body and a third flow path provided in an outer side of the outer heat transfer body are arranged; a heat exchange is performed between a second fluid flowing through the second flow path and the first fluid via the inner heat transfer body; and a heat exchange is performed between a third fluid flowing through the third flow path and the first fluid via the outer heat transfer body, wherein
   the flow reactor includes an inner tube and an outer tube,
   the cylindrical inner heat transfer body and the cylindrical outer heat transfer body are disposed in a gap formed between the inner tube and the outer tube,
   a first distance between a peak portion of the cylindrical inner heat transfer body and a valley portion of the cylindrical outer heat transfer body in a radial direction defines a maximum flow path width of the first flow path, and a second distance between a valley portion of the cylindrical inner heat transfer body and a peak portion of the cylindrical outer heat transfer body in the radial direction defines a minimum flow path width of the first flow path, the minimum flow path width being smaller than the maximum flow path width,
   the first flow path is a flow path that spirally circulates,
   a ratio ($\alpha/\beta$) of the maximum flow path width ($\alpha$) of the first flow path to the minimum flow path width ($\beta$) of the first flow path in a radius direction is 2 or more ($2<\alpha/\beta<\infty$), and
   a first angle formed by the peak portion of the cylindrical inner heat transfer body is larger than a second angle formed by the valley portion of the cylindrical outer heat transfer body.

4. The flow reactor according to claim 3, wherein
   the inner tube and the outer tube are concentrically arranged, the inner heat transfer body is fixed to an outside of the inner tube, and the outer heat transfer body is fixed to an inside of the outer tube; and
   a space between the inner tube and the inner heat transfer body is served as the second flow path, and
   a space between the outer tube and the outer heat transfer body is served as the third flow path,
   the second flow path and the third flow path are flow paths which spirally circulate; wherein
   a space generated by at least any one difference of an angle difference between the first angle of a screw thread of the inner heat transfer body as the external thread portion and the second angle formed by both flanks of the outer heat transfer body as the internal thread portion or a height difference between height of a screw thread of the inner heat transfer body as the external thread portion and height of a screw thread of the outer heat transfer body as the internal thread portion is the first flow path.

5. The flow reactor according to claim 1, wherein
   the first flow path, the second flow path, and the third flow path do not have a horizontal portion where the first fluid, the second fluid, and the third fluid are possibly accumulated.

6. The flow reactor according to claim 1, wherein
   a plurality of the spaces formed between the inner tube and the outer tube that are concentrically arranged are on concentric.

7. The flow reactor according to claim 1, wherein
   flow paths including the first flow path flowing the first fluid is coated with a coating with a corrosion resistant material.

8. The flow reactor according to claim 7, wherein
   the coating with the corrosion resistant material is a fluorine resin coating.

9. The flow reactor according to claim 2, wherein the first flow path, the second flow path, and the third flow path do not have a horizontal portion where the first fluid, the second fluid, and the third fluid are possibly accumulated.

10. The flow reactor according to claim 3, wherein the first flow path, the second flow path, and the third flow path do not have a horizontal portion where the first fluid, the second fluid, and the third fluid are possibly accumulated.

11. The flow reactor according to claim 4, wherein the first flow path, the second flow path, and the third flow path do not have a horizontal portion where the first fluid, the second fluid, and the third fluid are possibly accumulated.

12. The flow reactor according to claim 2, wherein a plurality of the spaces formed between the inner tube and the outer tube that are concentrically arranged are on concentric.

13. The flow reactor according to claim 3, wherein a plurality of the spaces formed between the inner tube and the outer tube that are concentrically arranged are on concentric.

14. The flow reactor according to claim 4, wherein a plurality of the spaces formed between the inner tube and the outer tube that are concentrically arranged are on concentric.

15. The flow reactor according to claim 5, wherein a plurality of the spaces formed between the inner tube and the outer tube that are concentrically arranged are on concentric.

16. The flow reactor according to claim 2, wherein flow paths including the first flow path flowing the first fluid is coated with a corrosion resistant material.

17. The flow reactor according to claim 3, wherein flow paths including the first flow path flowing the first fluid is coated with a corrosion resistant material.

18. The flow reactor according to claim 4, wherein flow paths including the first flow path flowing the first fluid is coated with a corrosion resistant material.

19. The flow reactor according to claim 5, wherein flow paths including the first flow path flowing the first fluid is coated with a corrosion resistant material.

20. The flow reactor according to claim 6, wherein flow paths including the first flow path flowing the first fluid is coated with a corrosion resistant material.

* * * * *